S. W. PAINE.

Shot-Cartridges.

No. 6,130. Reissued Nov. 10, 1874.

WITNESSES=

Jas. E. Hutchinson

John R. Young

INVENTOR.

Seth White Paine, by

Prindle and Lay his Attys

UNITED STATES PATENT OFFICE.

SETH WHITE PAINE, OF ROCHESTER, NEW YORK.

IMPROVEMENT IN SHOT-CARTRIDGES.

Specification forming part of Letters Patent No. 136,336, dated February 25, 1873; reissue No. 6,130, dated November 10, 1874; application filed November 5, 1874.

*To all whom it may concern:*

Be it known that I, SETH W. PAINE, of Rochester, Monroe county, State of New York, did invent certain new and useful Improvements in Shot-Cartridges, for which Letters Patent No. 136,336 were issued to me upon the 25th day of February, 1873, which Letters Patent have been found defective, in that the specification and claims do not cover and embrace all of the original invention and improvements as contained in the model and drawings filed in the United States Patent Office upon the 6th day of February, 1873. Now, therefore, being desirous to reissue said Letters Patent in the manner and form prescribed by law, I have prepared, and do hereby declare that the following is, a full, clear, and exact description of the said improvements, reference being had to the accompanying drawings making a part of this specification, in which—

Figure 1:
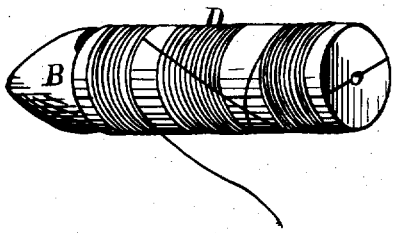
Figure 2:
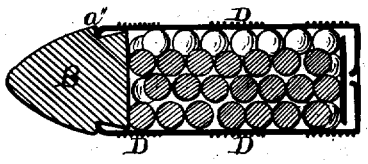
Figure 3:
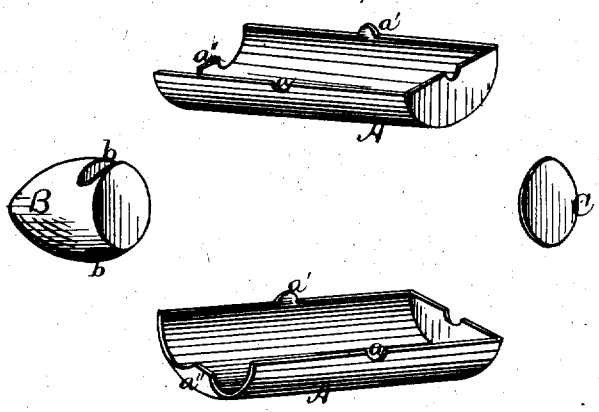
Figure 4:
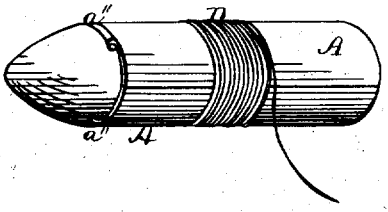

Figure 1 is a perspective view of my improved cartridge-case from the rear, as prepared for use. Fig. 2 is a central longitudinal section of the same. Fig. 3 is a perspective view of the parts composing the case separated from each other; and Fig. 4 is a like view of said case from the front, showing the binding-cord partially wound upon or around its periphery.

Letters of like name and kind refer to like parts in each of the figures.

The design of my invention is to furnish a means whereby a charge of shot may be confined together for any desired length of time after leaving the muzzle of the gun and then released and permitted to pass onward without obstruction from their envelope or case; to which end said invention consists, principally, in combining with the staves or sections of a longitudinally-divided cartridge-case a confining-cord wound upon or around the periphery of the same, substantially as and for the purpose hereinafter specified. It consists, further, in the construction of the sections or sides of the casing and in the means employed for locking the same in relative longitudinal position, substantially as and for the purpose hereinafter shown. It consists, finally, in the construction of the apex and the means employed for combining the same with the sides, substantially as and for the purpose hereinafter set forth.

In the annexed drawing, A and A′ represent two semi-cylindrical sections constructed of or from sheet metal and corresponding in size and shape, so that when their edges are placed together they shall form a hollow cylinder, partially or wholly inclosed at one end. In order that, when combined, the relative longitudinal positions of the sections shall be insured, a notch, *a*, is formed within one edge of each, and a corresponding projection, *a′*, provided upon the contiguous edge of the opposite section, by the engagement of which the result above named is obtained. Within the open end of the casing is placed an apex, B, constructed, preferably, of papier-maché or other light material, in the form of a conical slug or ball, which apex, at its base, just fills the end of said casing and is confined in place therein by means of a lip, *a″*, attached to and forming a part of each section, which extends inward and engages with a corresponding recess, *b*, formed within the base of said apex. Within the lower end of the casing is placed a base-plate or follower, C, which rests upon the inward-turned ends of the sections and practically closes the opening within the end of said casing. As thus constructed, the sections are combined, the base-plate inserted, the space within said sections filled with shot, and the apex placed in position, after which the whole casing is firmly bound together by means of a fine cord, D, wound around its periphery.

Upon leaving the gun, the cord D will be unwound by the current of air caused by the rapid motion of the cartridge, after which the casing will burst and its several parts fall to the ground, leaving the charge of shot free to perform their office.

It will be seen that upon the length of the cord wound around the casing will depend the amount of time consumed in unwinding the same and liberating the charge of shot, and that in correspondence therewith will be the distance traversed by said cartridge before bursting, so that, by increasing or diminishing the length of said cord, a longer or shorter range will be obtained.

If desired, the sections may be liberated simultaneously at both ends by winding the cord first around the same at their longitudinal centers for a space of about one-fourth of an inch, from thence carrying it to one end and winding it inward toward said central portion, after reaching which the cord is carried to the opposite end and in a like manner wound inward again, the result of which method being that the ends of the casing are first freed from said cord, and lastly the center, by which means neither end can spread outward in advance of the other, (so as to change the direction of the cartridge;) but all of said parts are confined in place until the last portion of the cord has been unwound.

In addition to closing the opening in the rear end of the casing, the base-plate furnishes a sufficient support for the charge at the instant that the sections of the casing are falling away at oblique angles.

Although the apex is intended principally to perform the office of a wad over the shot, to guide the cartridge and to lessen the resistance offered to its passage through the air, by constructing said apex of lead it may be used as a ball, and thus increase the capability and value of the cartridge.

Having thus fully set forth the nature and merits of my invention, what I claim as new is—

1. In combination with the shell of a longitudinally-divided cartridge-case, a confining-cord wound upon or around the periphery of the same, substantially as and for the purpose specified.

2. The sections A and A′, when constructed as shown, and provided with the notches *a* and projections *a′*, substantially as and for the purpose shown.

3. The apex B, constructed as shown, provided with the recesses *b* and combined with the sections A and A′, provided with the lips *a″*, substantially as and for the purpose set forth.

In testimony that I claim the foregoing I have hereunto set my hand this 23d day of June, 1874.

SETH WHITE PAINE.

Witnesses:
F. A. HITCHCOCK,
W. MARTIN JONES.